Sept. 11, 1923.  1,467,322
F. E. HUTCHINGS
BUMPER OR FENDER FOR VEHICLES
Filed March 3, 1922  3 Sheets-Sheet 1

INVENTOR
Frederick E. Hutchings
BY
Dean, Fairbank, Obrieg & Hirsch
ATTORNEYS

Sept. 11, 1923.  1,467,322
F. E. HUTCHINGS
BUMPER OR FENDER FOR VEHICLES
Filed March 3, 1922   3 Sheets-Sheet 2
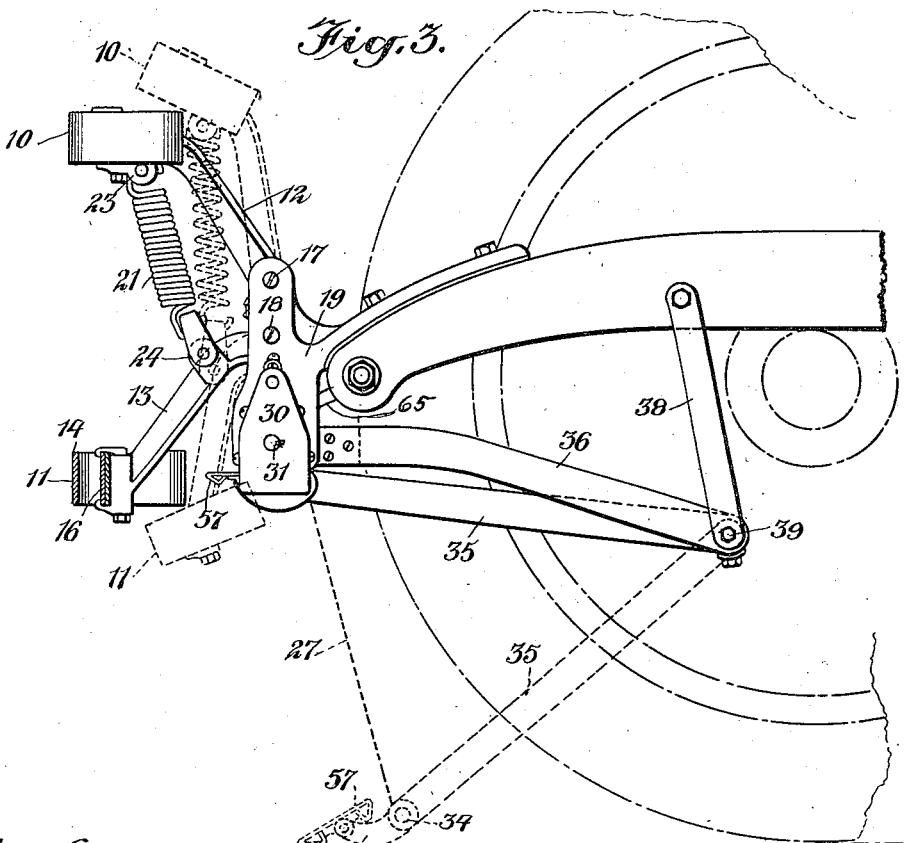
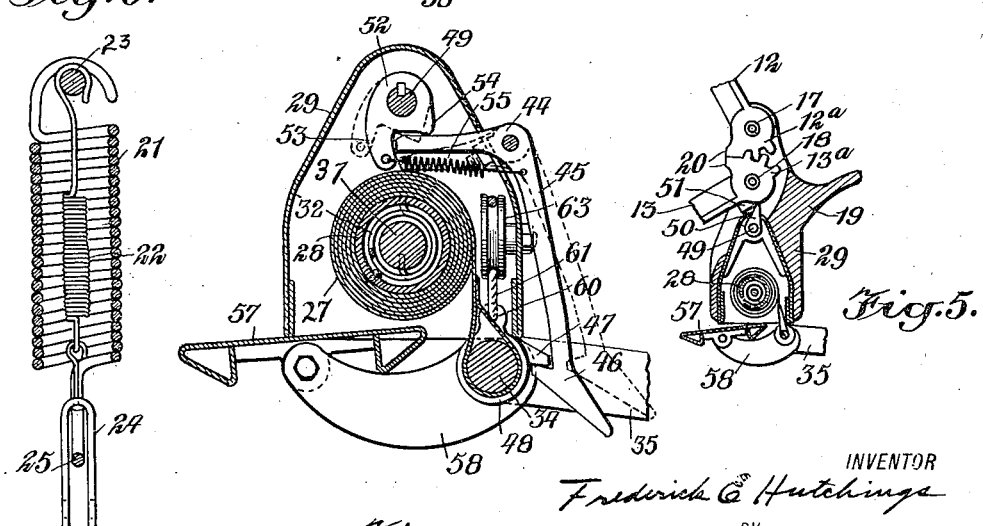

Sept. 11, 1923.

F. E. HUTCHINGS

BUMPER OR FENDER FOR VEHICLES

Filed March 3, 1922

INVENTOR
Frederick E. Hutchings
BY
Dean Fairbank Abright Hirsch
ATTORNEYS

Patented Sept. 11, 1923.

1,467,322

UNITED STATES PATENT OFFICE.

FREDERICK E. HUTCHINGS, OF BROOKLYN, NEW YORK, ASSIGNOR TO HUTCHINGS MANUFACTURING CO., INC., OF NEW YORK, N. Y., A CORPORATION OF NEW YORK.

BUMPER OR FENDER FOR VEHICLES.

Application filed March 3, 1922. Serial No. 540,793.

*To all whom it may concern:*

Be it known that I, FREDERICK E. HUTCHINGS, a citizen of the United States, and resident of Brooklyn, in the county of Kings and State of New York, have invented certain new and useful Improvements in Bumpers or Fenders for Vehicles, of which the following is a specification.

This invention is an improvement in safety devices for use on vehicles to protect the vehicle and the person or object struck by it, in case of accident or collision.

As one important feature of my invention I provide a bumper bar construction which includes a pair of separate bars which are individually yieldable, and which are also so mounted as to move toward and from each other and rearwardly and forwardly, in the control of separate yielding means.

As another feature I pivotally mount the arms of the bumper bars and connect these arms by springs whereby the movement of said bars in respect to each other is yieldingly resisted.

As a further feature the arms are geared together whereby simultaneous and opposite movement is insured, and the action of gravity and vibration is neutralized.

As a further feature, I utilize the rearward movement of the bumper bar to release and drop a fender or wheel guard to prevent a person or object with which the bumper has collided, from passing beneath the wheels.

As a further feature I provide an improved form of bracket whereby a bumper or a fender may be detachably secured to or mounted on the front of the chassis frame of a motor vehicle without alteration in the construction or design of the latter.

As a further feature I provide improved means for raising the curtain or other fender or wheel guard and automatically locking it in raised position without requiring the operator to leave his seat in the vehicle.

Various other features of importance will be pointed out hereinafter, or will be apparent from a consideration of the preferred embodiment illustrated in the accompanying drawings. In these drawings:

Fig. 3 is an end view.

Figure 1:
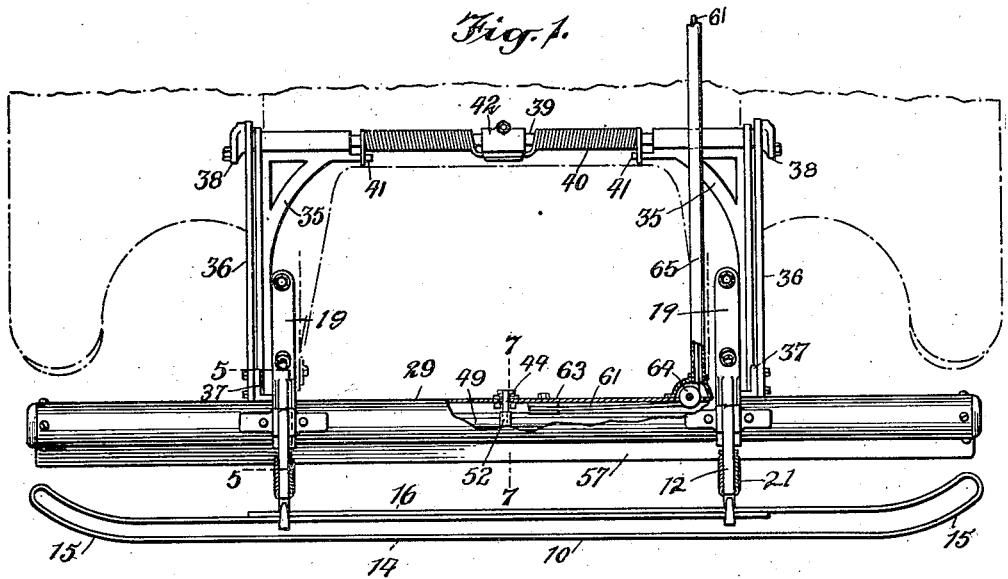
Fig. 1 is a top plan view, a portion of the vehicle being shown in dotted lines.
Figure 2:
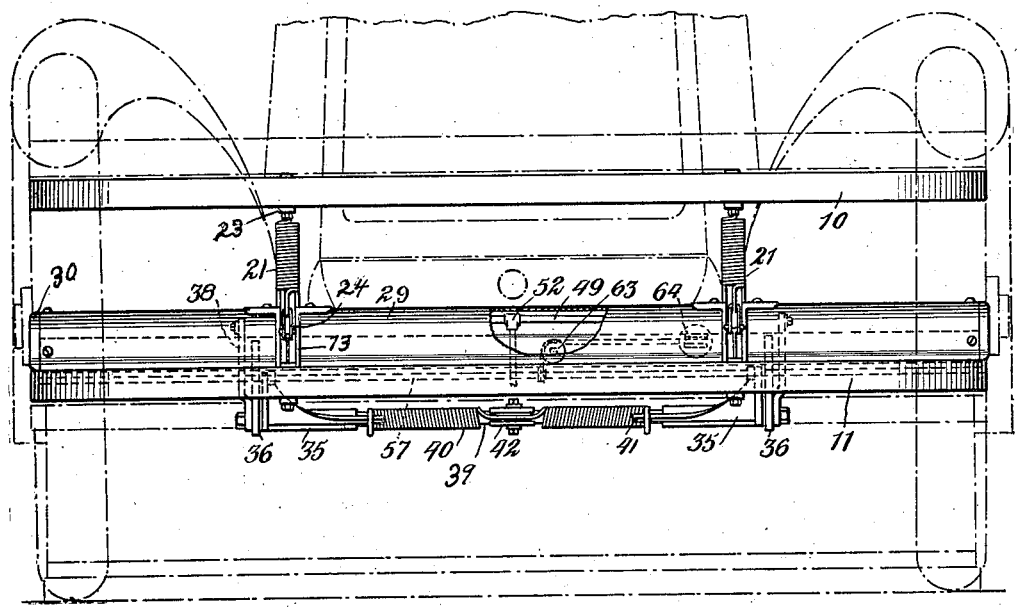
Fig. 2 is a front elevation.

Figs. 4 and 5 are transverse sections on different scales and in planes indicated by the lines 4—4 and 5—5 respectively of Fig. 1.

Figure 7:
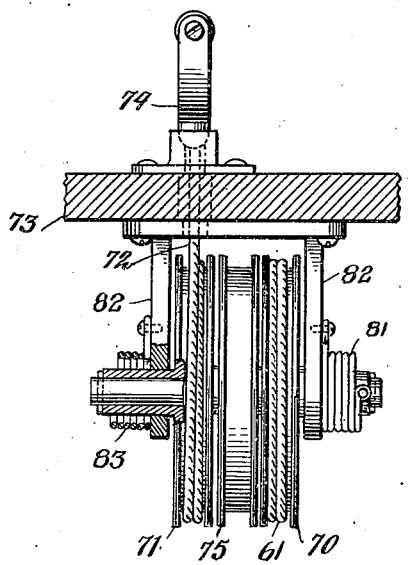

Fig. 6 is a central longitudinal section through spring connections between the bumper bars, Fig. 7 is an edge view of a cable reeling device.

Figure 8:
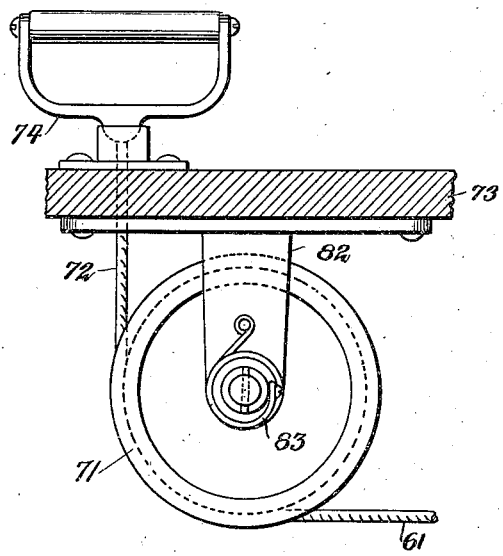

Fig. 8 is an end view of the parts shown in Fig. 7.

Figure 9:
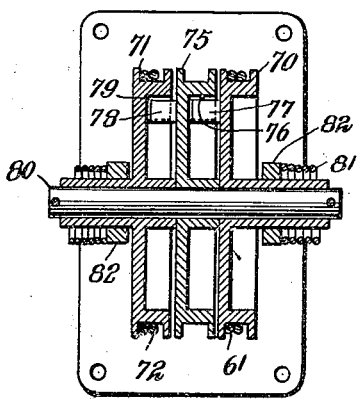
Figure 10:
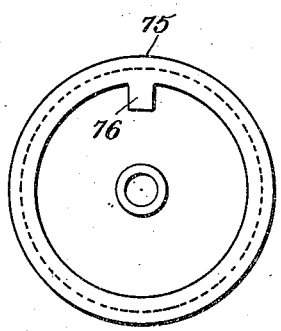

Fig. 9 is an inverted horizontal section in the plane of the axle shown in Fig. 7, and Fig. 10 is an end view of the intermediate or idler wheel.

In my improved construction, I provide a pair of bumper bars 10 and 11 mounted to extend transversely across the vehicle preferably in front of the front wheels, and preferably of a length substantially equal to the tread of the vehicle. These bumper bars are separately mounted in spaced superposed positions, the upper bar 10 being carried by a pair of arms 12, and the lower bumper bar 11 being carried by a pair of arms 13. I do not wish to be limited to any specific form of bar, although I preferably employ spring steel stock substantially rigid vertically but yieldable horizontally. As shown, each bar is formed of a substantially closed complete loop formed of a strip of steel bent to form a front impact bar portion 14 rearwardly curved end loop portion 15, and a rear bar portion 16 formed by the overlapping ends of the strip of steel and of double thickness between the two supporting arms. Preferably only the rear bar portion is directly connected to the arms so that the front bar portion may yield rearwardly until it engages with the rear or reinforcing bar portion 16. Thus the bar itself may yield either rearwardly or forwardly at either end or may yield rearwardly at the center portion independently of any movement of the supporting arms. The upper arms 12 and the lower arms 13 are mounted on pivots 17 and 18 in a pair of brackets 19. Between the pivots the two bars have intermeshing gear segment portions 12$^a$ and 13$^a$, so that a swinging movement of one arm causes a corresponding and opposite swinging movement of the other arm. The upper arms 12 are in substantially the same vertical plane as the lower arms 13, and each upper arm is connected to its corresponding lower one by resilient or yielding means normally tending to bring the arms toward each other. In other words, to swing the upper bumper bar 10 downwardly, and the lower bumper bar 11 upwardly. This movement is limited by a pair of coacting stops 20 adjacent to the gear segment sections 12$^a$ and 13$^a$, as shown particularly in Fig. 5. The yielding connection between the two arms of each superposed pair includes a heavy coil spring 21 and a lighter coil spring 22 (Fig. 6). These springs have their upper ends connected to a suitable bracket 23 on the upper arm, and their lower ends to a bracket 24 on the lower arm. The lower bracket is such that it has lost motion connections to the outer or heavier spring. The inner or lighter spring is always under tension, and holds the two bumper bars in predetermined position with the stops 20 in engagement with each other. The heavy spring has its lower end or terminal loop 25 movable vertically in a slot in the bracket 24, so that this spring does not come into play until after the arms have been moved away from each other through a distance corresponding to the amount of this lost motion. Thus the bumper bars may yield, due to their own resiliency, and may yield by the extension of the spring 22 for a limited distance, and thereafter the heavy spring 21 comes into play and a greatly increased resistance is offered to further separating and rearward movement of the bumper bars. By this triple yielding effect the blow imparted to a person or object in case of collision with the bumper bars is progressively cushioned and the liability of injury to either the bumper, the vehicle, or the object is materially reduced.

To further reduce liability of injury to the person or a movable object with which the vehicle may collide, I provide a wheel guard or fender adapted to be automatically dropped to the ground in case of a predetermined rearward movement of the bumper bars. This wheel guard or fender is in the form of a curtain 27 normally wound on a roller 28 but adapted to be unwound so that its lower edge may extend to or approximately to the ground, as shown in dotted lines in Fig. 3. The curtain and its roller are supported in a housing 29 which is rigid with and carried by the brackets 19 which support the bumper arms. The body portion of the casing may be formed of sheet metal in substantially inverted channel or U shape, and provided with end walls 30 which carry the curtain roller supporting shaft 31. The shaft is held against rotation by a suitable key or other locking means, and the roller 28 is rotatably mounted on the shaft. Between the shaft and the roller there is provided a helical spring 32 having one end secured to the shaft and the other end to the roller, so as to exercise a force at all times tending to rotate the roller counter-clockwise from the position shown in Fig. 4, and to keep the curtain wound up on the roller. This construction of shaft roller and spring may be similar to that commonly employed in ordinary curtain or shade rollers. The free end of the curtain is secured to a transverse bar 34 which is mounted in a pair of pivoted arms 35 normally extending in a substantially horizontal position as shown in Fig. 3, and projecting rearwardly from the curtain housing to rigid pivotal supports. These pivotal supports are shown in the form of brackets each including a bar 36 rigidly secured to a lug 37 on its corresponding bracket 19, and a bar 38 having its upper end secured to the chassis and extending downwardly to a transverse rod 39 which engages the bars 36 and 38 and holds the bracket at one side of the vehicle rigid with that on the other. The bar 39 serves as the pivotal support for the arms 35, so that they may swing from the raised position shown in solid lines in Fig. 3 to the lowered position shown in dotted lines.

For rapidly lowering the curtain and unwinding it against the tension of the curtain spring 32, the rod 39 is provided with a coil spring 40. This is preferably so mounted that it acts equally on the two arms 35. As shown, it has two portions reversely coiled so that the opposite ends of the spring engage with lugs or projections 41 on the two arms 35, and the center portion engages with a collar 42 at the center of the shaft 39. By rotating this collar in the proper direction, the two halves of the spring may be put under equal tension so as to exert a tendency to swing the arms downwardly and the collar 42 may then be locked in position by a suitable set screw or other locking means. This tension may be adjusted or varied at will by releasing the collar and relocking it after the desired rotation in the proper direction to increase or decrease the tension. Obviously the tension on the spring 40 must be materially greater than that on the spring 32 in order to permit one spring to act against the other and rapidly unwind the curtain when the latter is released.

The curtain is provided with means for normally holding it in wound up or rolled position, and this retaining means is so designed as to be operated by the bumper bars or arms upon a predetermined movement of the latter. As shown the casing 29 has a bracket 44 on which is pivotally mounted a bell crank lever 45, one end of said lever having a catch or shoulder portion 46 for engaging beneath a lug or projection 47 on the curtain lowering or unwinding means. The rod 34 is non-rotatably mounted in the tecting sheath, casing or hollow conduit 65 which may if desired be an ordinary flexible metal conduit.

For winding up the cable I provide a drum 70 of such diameter that a comparatively few turns of cable on the periphery thereof will equal the maximum range of movement of the lower edge of the curtain. It is essential that such drum be free to rotate and permit the unwinding of the cable therefrom during the dropping of the curtain. For rotating the drum to wind up the cable and at the same time leave the drum in such condition that it may freely rotate in the opposite direction, I provide a second drum 71 mounted coaxial therewith, and having a second cable 72 wound thereon with one end of the cable secured to the drum and the other end extending through the dashboard or instrument board of the car, or through the floor to an operating handle 74. Between the two drums 70 and 71 there is an intermediate wheel 75 which has a single tooth or projection 76 engaging with a single tooth or projection 77 on the drum 70. It also has a single tooth or projection 78 engaging with a single tooth or projection 79 on the drum 71. The three members 70, 71 and 75 are independently rotatable on a shaft 80. A coil spring 81 engages the supporting bracket 82 and a hub of the drum 70, so as to tend to rotate the drum in such a direction as to keep the cable 61 wound thereon. A similar spring 83 engages the bracket and a hub of the drum 71, so as to normally keep the cable 72 wound thereon. The operation of these parts is as follows:

When the curtain is released and starts to drop, the pull on the cable 61 rotates the drum 70 against the action of the spring 71 through nearly one complete revolution without any rotation of the wheel 75 or the drum 71. After nearly 360°, the tooth 77 engages with the tooth 76 and during the next nearly 360° rotation of the drum 70 the wheel 75 will turn with it, but the drum 71 will remain at rest. Thus the drum 70 may make nearly two complete revolutions while the drum 71 remains at rest, and during these two nearly complete revolutions enough of the cable will be unwound from the drum 70 to permit maximum drop of the curtain. With the curtain in the lowered position the driver may pull on the handle 74 and the resulting rotation of the drum 71 will cause simultaneous rotation of both the wheel 75 and the drum 70, due to the direct and immediate engagement of the lugs 76, 77, 78, and 79. The drum 70 will thus be rotated in the opposite direction through nearly two revolutions, and the curtain will be raised and automatically relocked. As soon as the curtain engages the catch of the bell crank lever 45, the operator may release the handle 74. The spring 83 will turn the drum 71 through nearly 360° to wind up half the cable 72 without rotation of the wheel 75 or the drum 70. It may rotate during nearly another 360° along with the wheel 75 to wind up the remainder of the cable 72 without rotation of the drum 70. Thus, in normal position both the cables are wound up on their respective drums, but the drum 70 is free so that the cable 61 may freely unwind upon the dropping of the curtain.

In the construction above described, the pull on the cable 61 acts merely to lift the lower edge of the curtain and permit the spring 32 to rewind the curtain. It will of course be obvious that in some constructions the spring 32 may be entirely omitted and the cable 61 secured to and wound directly on the curtain roller 28 or on a drum rigid therewith. In that event a pull on the cable would cause a direct and positive rotation of the curtain roller which would rewind the curtain thereon without necessitating any spring connections between the roller and its support.

In my improved construction the brackets 19 are so designed that they may be readily bolted to the forwardly projecting side members of the chassis of most makes or designs of automobiles. The brackets 61 may be bolted, clamped or otherwise secured to these chassis members and the links or bars 38 may be cut to the proper length and bent to the desired form if such bending is necessary to hold the pivot rod 39 rigid in respect to the frame. The brackets 19 are adjustable lengthwise of the curtain housing. In other words, they may be riveted or bolted to the housing at the proper distance apart, depending upon the distance between the chassis frame members of the particular vehicle to which the device is to be attached. Likewise, the arms are adjustable lengthwise of the bumper bars for the same reason. The device may thus be made up in a single or a comparatively few standard sizes and designs and readily adapted to a wide variety of sizes and makes of motor vehicles. No alteration in the shape or construction of the vehicle itself is required, and the entire device may be readily attached in a comparatively short time, and without requiring other skill than that ordinarily employed in the attaching of automobile accessories, such as bumpers, tire carriers, etc.

Having thus described my invention, what I claim as new and desire to secure by Letters Patent is:—

1. A device of the class described, including two pairs of superposed pivoted arms adapted to be supported by opposite side portions of a vehicle frame, a spring connecting the two arms of each pair and tending to swing them toward each other, stops limiting said swinging movement, and a front ends of the arms 35 and on this is non-rotatably mounted a collar 48 carrying the lug 47. The parts are shown in normal or raised position in Fig. 4. There may be a plurality of these catches engaging with corresponding projections at different points along the length of the lower edge of the curtain, but in order to insure the release of all parts of the curtain at the same instant and prevent one end from dropping ahead of the other, I preferably employ only a single retaining catch and mount this midway between the ends of the curtain housing.

For operating the bell crank lever upon a predetermined movement of the bumper bars, and for preventing any accidental release of the catch, I provide a rock shaft 49 rotatably mounted in the upper part of the curtain housing above the curtain, and having means for effecting the rotation of the shaft upon a predetermined downward swinging movement of either of the bumper arms 13. As shown, the rock shaft 49 has a pair of upwardly extending fingers 50 disposed adjacent to cam projections 51 on the bumper arms 13. Thus, any downward movement of either arm 13 will cause the rock shaft 49 to turn in a clockwise position from that shown in Figs. 4 and 5. Intermediate of its ends the rock shaft has means operatively engaging with the bell crank lever. This is shown as a collar 52 having a depending finger portion 53 and a cam 54 disposed above the bell crank lever for forcing the end of the latter downwardly upon a predetermined rotation of the rock shaft. A spring 55 connects the lower end of the finger 53 and a portion of the bell crank lever below the pivot of the lever, so that it serves to hold the hook 46 beneath the shoulder 47, the finger 50 against the cam 51, and the bell crank 45 against the cam 54.

From the foregoing it will be seen that in case the vehicle collides with a person or object the shock of the collision will be absorbed in part by the resiliency of the bumper bars themselves, and to a further extent by the rearward movement of the bars against the tension of the springs 21 and 22. The parts are preferably so designed that when the bumper bars have been moved to such an extent as will take up the lost motion at the end of the springs 21 and bring said springs into operation, the rock shaft 49 will have been oscillated through a sufficient angle to release the curtain and drop it to the ground. This curtain will act to pick up any person who may have been knocked down by the bumper bars, and will prevent him from passing beneath the wheels of the vehicle. To better insure the proper pick-up action of the curtain and to prevent injury to or wrecking of the apparatus in case the lower edge of the curtain should strike an immovable obstruction in the road, I provide a shoe which may be constructed substantially as illustrated in my prior Patent No. 1,133,287, issued March 30th, 1915. This is here shown as a sheet metal plate 57, the front and rear edges of which may be turned over to stiffen or reinforce the same, and to render the edges comparatively blunt, and the under surface intermediate of the edges is connected to the rod 34 by a plurality of links 58. When the curtain is dropped the parts assume the position shown in dotted lines in Fig. 3 and the plate 57 is so inclined that it tends to cause any object or article to ride up over the plate on to the curtain. In case the front edge of the plate strikes an immovable obstruction the plate may swing about its pivotal connection on the links 58 so as to incline in the opposite direction and ride up over the obstruction. Although the curtain when unrolled will normally extend directly from the roller to the rod 34, as indicated in dotted lines in Fig. 3, it will of course be evident that there is a sufficient amount of reserve curtain on the roller so that in case a person or object is picked up by the fender, the curtain can curve or belly rearwardly to receive and support such person or object.

The springs 21 and 22 tend to return the bumpers to their normal position as soon as the pressure against the bumper bars is removed, but it is necessary to overcome the action of the spring 40 in order to re-roll the fender. In some constructions it may be necessary for the driver to get out and lift up the bar 34 until it re-engages with the retaining catch while the curtain automatically rewinds by the action of the spring 32 during the raising of this bar. Preferably means are provided whereby the curtain may be raised by the driver without leaving his seat. As shown, the collar 48 which is mounted midway between the ends of the rod 34 has an eyelet 60 (Fig. 4) to which is connected a cable 61. This extends over a pulley 63 mounted on the rear wall of the curtain housing substantially directly above the collar 48 and beneath the bell crank lever 45. This pulley is mounted to rotate about a substantially horizontal axis. Adjacent to one of the side frame members of the chassis the curtain housing is provided with a second pulley 64 which is mounted to rotate about a substantially horizontal axis. Thus the cable may extend lengthwise of the vehicle along one side thereof to the pulley 64, then lengthwise of the housing to the pulley 63, and then downwardly to the bar 34. By exerting the proper pull on the cable the bar 34 may be raised and the curtain will automatically rewind. Preferably the portion of the cable from the curtain housing to the operating handle for the curtain is enclosed in a propair of spaced bumper bars one carried by the two upper arms of said pairs and the other carried by the two lower arms of said pairs.

2. A device of the class described, including a pair of upwardly and forwardly inclined arms pivotally supported upon the opposite side portions of a vehicle frame, a pair of downwardly and forwardly inclined arms pivotally supported adjacent to the pivotal supports of the first mentioned arms, a pair of bumper bars one carried by the first mentioned arms and the other carried by the second mentioned arms, means for holding said bumper bars in spaced relationship, and yielding means normally tending to prevent swinging movement of said arms to separate said bumper bars.

3. A device of the class described, including a pair of brackets adapted to be detachably secured to a vehicle frame, a pair of arms pivoted to each of said brackets, a spring connecting the two arms of each bracket and tending to swing them toward each other, stops limiting said swinging movement, and a pair of spaced bumper bars, one carried by one arm of each of said pairs and the other carried by the other arm of each of said pairs.

4. A device of the class described, including a pair of brackets adapted to be detachably secured to a vehicle frame, two pairs of pivoted arms, one pair mounted on one bracket and the other pair mounted on the other, a pair of yielding bumper bars one carried by an arm of each bracket, said bumper bars being formed of yielding material, and separate yielding means normally tending to prevent relative movement of said arms.

5. A device of the class described, including a pair of brackets adapted to be detachably secured to a vehicle frame, two pairs of pivoted arms, one pair mounted on one bracket and the other pair mounted on the other, a pair of yielding bumper bars one carried by an arm of each bracket, separate yielding means normally tending to prevent relative movement of said arms, and auxiliary yielding means effectively tending to prevent said movement after a predetermined movement against the action of the first mentioned yielding means.

6. A device of the class described, including a pair of spaced bumper bars, a pair of pivoted arms supporting one bar, a separate pair of arms supporting the other bar, a pair of springs yieldingly resisting relative movement of said bars, and a second pair of springs also yieldingly resisting relative movement of said bars but coming into operation only after a predetermined action of the first mentioned springs.

7. A device of the class described, including a pair of relatively movable bumper bars, a wheel guard independent thereof, and means for releasing the latter to permit it to move to operative position upon a predetermined movement of said bumper bars in respect to each other.

8. A device of the class described, including a pair of bumper bars, a curtain adapted to form a wheel guard and normally held in rolled position independent of said bars, and means for unrolling said curtain and dropping one edge thereof to the ground upon a predetermined relative movement of said bars.

9. A device of the class described, including a pair of bumper bars, a curtain adapted to form a wheel guard and normally held in rolled position, means for unrolling said curtain and dropping one edge thereof to the ground upon a predetermined relative movement of said bars, and means yieldingly resisting but permitting further relative movement of said bars.

10. A device of the class described, including a pair of brackets adapted to be secured to a vehicle frame, a curtain roller supported thereby, a pair of pivoted arms secured to the free edge of said curtain, a spring normally tending to swing said arms downwardly to unroll and lower the curtain, means normally preventing said unrolling and lowering movement, and a bumper bar yieldingly mounted on said brackets and adapted to release said retaining means upon a predetermined rearward movement of said bumper bar.

11. A device of the class described, including a pair of brackets adapted to be detachably secured to a vehicle frame, a curtain housing carried thereby, a curtain normally rolled within said housing, two pairs of arms, one pair being pivotally mounted upon each of said brackets, a pair of bumper bars each carried by one arm of each pair of arms, yielding means normally resisting relative movement of said arms, and means for unrolling the curtain upon a predetermined relative movement of said arms.

12. A device of the class described, including a curtain roller adapted to be supported on a vehicle in front of the wheels thereof, a curtain secured to said roller, means for normally holding the curtain in rolled position, means including a bar engaging with the lower edge of said curtain for lowering or unrolling it, a cable connected to said last mentioned means and a drum upon which said cable may be wound for raising said bar during rewinding of the curtain.

13. A device of the class described, including a curtain roller adapted to be secured to a vehicle frame in front of the wheels thereof, a bar secured to the lower edge of the curtain, a spring normally tending to lower said bar and unroll the curtain, a cable adapted when pulled to effect the rewinding of the curtain, and a drum upon which cable may be wound.

14. A device of the class described, including a curtain normally supported in rolled position in front of the wheels of a vehicle, means for unrolling said curtain in case of collision, and means for rerolling said curtain, including a drum, a cable normally wound on and connected to said curtain, a second drum coaxial with the first mentioned drum, a separate cable wound on said second drum, lost motion connections between said drums, and resilient means tending to rotate said drums in opposite directions to hold both cables in wound position.

Signed at New York in the county of New York and State of New York, this 2nd day of March, A. D. 1922.

FREDERICK E. HUTCHINGS.